US009251676B2

(12) United States Patent
Taylor et al.

(10) Patent No.: US 9,251,676 B2
(45) Date of Patent: Feb. 2, 2016

(54) HAPTIC SELF-SERVICE TERMINAL (SST) FEEDBACK

(71) Applicant: NCR Corporation, Duluth, GA (US)

(72) Inventors: Jason Wayne Taylor, Suwanee, GA (US); Levino Felix Perrucci, Lawrenceville, GA (US)

(73) Assignee: NCR CORPORATION, Duluth, GA (US)

( * ) Notice: Subject to any disclaimer, the term of this patent is extended or adjusted under 35 U.S.C. 154(b) by 2 days.

(21) Appl. No.: 14/225,746

(22) Filed: Mar. 26, 2014

(65) Prior Publication Data

US 2015/0279180 A1 Oct. 1, 2015

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC .............................. A63F 13/16; A63F 3/017
USPC ........ 340/407.1, 407.2, 514, 517; 463/30, 36, 463/47
See application file for complete search history.

(56) References Cited

U.S. PATENT DOCUMENTS

| | | | | |
|---|---|---|---|---|
| 2008/0252596 | A1* | 10/2008 | Bell et al. | 345/156 |
| 2009/0221368 | A1* | 9/2009 | Yen et al. | 463/32 |
| 2010/0093435 | A1* | 4/2010 | Glaser et al. | 463/36 |
| 2011/0279249 | A1* | 11/2011 | Kipman et al. | 340/407.1 |
| 2015/0082401 | A1* | 3/2015 | Gupta et al. | 726/7 |

* cited by examiner

*Primary Examiner* — Tai T Nguyen
(74) *Attorney, Agent, or Firm* — Schwegman, Lundberg, Woessner

(57) ABSTRACT

Haptic Self-Service Terminal (SST) feedback is provided. A customer transacting at a SST during a Self-Service (SS) transaction receives in-air tactile communication for assisting the customer during the SS transaction.

19 Claims, 4 Drawing Sheets

HAPTIC SELF-SERVICE TERMINAL (SST) FEEDBACK

BACKGROUND

Increasingly consumers are conducting financial transactions through Self-Service Terminals (SSTs) without the assistance of a clerk. In fact, in many cases these transactions are conducted without any store staff in the vicinity of the SSTs.

For the most part, Self-Service (SS) transactions have been effectively inaccessible to the visually and hearing impaired. Typically, SSTs deploy a braille engraved keypads in addition to touchscreen options in order to assist the visually impaired in conducting a SS transaction. The hearing impaired largely relay on visual options when conducting SS transactions, but in some cases a headphone jack is available for the hearing impaired to insert headphones to receive directed sound at a higher volume. Both options available to the hearing and visually impaired are not optimal and require more time and effort to complete a SS transaction.

In addition, often (particularly at a grocery SS checkout) a customer may have a large amount of items and is visually focused on handling the items from the cart through the scanner and into his/her bag. The customer relies on hearing the sound indicating that the scanner properly scanned the items and infrequently looks at the monitor to confirm the item was properly scanned. This simple task is not so simply for the hearing impaired because the audible ping from the scanner is inaudible to the hearing impaired. So, the hearing impaired has to visually focus on the monitor during the SS transaction, which can significantly slow down the transaction and for a large amount of items being processed, may deter the hearing impaired from even attempting a SS grocery checkout.

In fact, in noisy environments even customers without handicaps may be unable to detect the confirmation pings from a SS grocery checkout, which can impact the queue lines and transaction throughputs during high traffic periods at the grocery store.

SUMMARY

In various embodiments, haptic Self-Service Terminal (SST) feedback mechanisms are presented.

According to an embodiment, a SST haptic feedback system is provided. The SST haptic feedback system includes an SST and a haptic controller. The haptic controller is configured and adapted to: execute on the SST, receive a message from a device of the SST, and customize the message for a haptic transducer to communicate an in-air communication directed at a customer transacting at the SST.

DETAILED DESCRIPTION

Figure 1:
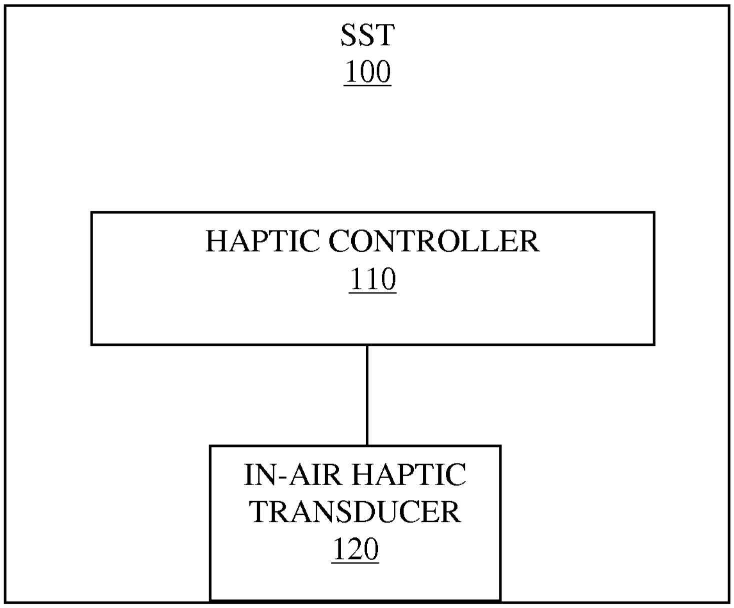
FIG. 1 is a diagram of a Self-Service Terminal (SST) for providing in-air haptic feedback for Self-Service (SS) transactions, according to an example embodiment.

FIG. 1 is a diagram of a Self-Service Terminal (SST) 100 for providing in-air haptic feedback for Self-Service (SS) transactions, according to an example embodiment. The various components are illustrated and the arrangement of the components is presented for purposes of illustration only. It is to be noted that other arrangements with more or less components are possible without departing from the in-air haptic feedback for SS transactions presented herein and below.

The techniques, methods, and system presented herein and below for in-air haptic feedback for SS transactions can be implemented in whole or in part in one, all, or some combination of the components shown with the FIG. 1. A variety of the techniques and methods are programmed as executable instructions in memory and/or non-transitory computer-readable storage media and processed on one or more processors associated with the various components.

The discussion of the SST 100 is within the context of a retail grocery store having one or more SSTs. It is noted that the SST 100 is also applicable to any industry employing SSTs, such as but not limited to, banking institutions, government agencies, entertainment venues, transportation agencies, non-profit organizations, education facilities, etc. Thus, the description that follows below is but one embodiment of the invention and it not intended to limit the invention to only grocery-based SSTs.

The example SST 100 includes a haptic controller 110 and an in-air haptic transducer.

The SST 100 is presented in greatly simplified form and is used to illustrate only those portions of components used for purposes of achieving in-air haptic feedback during SS transactions.

In an embodiment, the SST 100 is an Automated Teller Machine (ATM).

In an embodiment, the SST 100 is a grocery store SS checkout station.

In an embodiment, the SST 100 is a kiosk.

The SST 100 includes one or more resources, such as: processor(s), memory, storage, scanners, input mechanisms, software, displays, loading bay, scale for weighing items, and the like. A customer utilizes the SST 100 to perform a SS transaction at a grocery store checkout station. The store may have a plurality of SSTs (not shown in the FIG. 1) networked together, perhaps, through an optional store server 150.

The haptic controller 110 is implemented as one or more software modules that reside and are programmed in memory and/or non-transitory computer-readable storage media. The software modules execute on one or more processors of the SST 100.

The haptic controller 110 interacts with other components of the SST 100, such as a scanner, audio device, weighing scales, monitor, printer, keyboard, and/or transaction engine. When these devices convey information audibly or visually to a customer during a SS transaction, the haptic controller 110 is provided the electronic information that is to be conveyed for that transaction and relays the electronic information to the in-air haptic transducer 120.

The haptic controller 110 may also evaluate and enforce policy conditions to determine whether electronic information is to be relayed to the in-air haptic transducer 120 or whether the electronic information is to be customized based on a profile associated with a transaction occurring at the SST 100. So, the haptic controller 110 manages what electronic information that is being communicated through an audio, visual, and/or print device (such as through interactions with a transaction manager executing on processors of the SST 100) and the haptic controller 110 can customize any relayed electronic information with specific profile attributes associated with a given customer (attributes such as preferred spoken language, volume level, audible tones, and the like).

The in-air haptic transducer 120 receives the electronic information (along with any customer-specific profile attribute customizations), which is to be communicated to a customer for a given SS transaction, and converts that electronic information into instructions transmit air pluses at the customer. These air pulses can be felt on the skin or near the skin of the customer and in some cases the air pulses can excite the air molecules about the customer to create sound. The tactile air pulses and/or air-generates sounds can be directed to a different body parts of the customer, such as ear, arm, chest, leg, feet, hands, and the like.

A camera can be used along with image and video recognition software and interfaced to the haptic controller 110 so that the haptic controller 110 can provide with the electronic information positioning information to the in-air haptic transducer 120 (so the in-air tactile pulses and/or in-air generated audio can be properly directed at the customer).

In an embodiment, sensors are used instead of a camera or in cooperation with the image and video recognition to detect the position of the customer at the SST 100 and/or physical dimensions of the customer. The position and/or physical dimensions of the customer are then provided to the haptic controller 110 so that the haptic controller 110 can provide the electronic positioning information to the in-air haptic transducer 120 (so the in-air tactile pulses and/or in-air generated audio can be properly directed at the customer).

The haptic controller 110 can also determine the needed intensity of any in-air tactile pulses directed at the customer and provide this with the electronic information to the in-air haptic transducer 120. Similarly, the volume of any in-air generated audio directed at the customer can be provided by the haptic controller 110 to the in-air haptic transducer 120.

So, the haptic controller 110 determines: when a portion of a customer's SS transaction needs communicated to a customer, where the customer is positioned, whether the customer is associated with any profile to customize in-air communications, the intensity and/or volume of the in-air communications, and sends that electronic information to the haptic transducer 120. The haptic transducer 120 uses the electronic information to position its in-air haptic transmitter and generate air pules and/or air-generated sounds to communicate the portion of the transaction that should be communicated to the customer before, during, and at the conclusion of the SS transaction.

In an embodiment, the air pulses can also make vibrations that can be felt by the customer.

In an embodiment, the haptic controller 110 can be interfaced to a scent generating device that can imbue custom scents in proximity to the SST 100. This may be useful for advertisements of the enterprise associated with the SST 100 such that scents related to products (such as bakery goods) can be emitted at the SST 100 simultaneously with advertisements appearing on the monitor of the SST 100 during the SS transaction.

The in-air (free air) haptic transducer 120 generates controlled and directed air pulses or vibrations to provide SS transaction feedback in the free space about the customer positioned at the SST 100.

Consider the following example to more fully appreciate the beneficial aspects of the SST 100. Suppose a customer (can be visually or hearing impaired or can be an individual with no known impairments) is at a grocery SS checkout station (modified with the teachings herein as SST 100) and the customer is required to scan his/her own items across a scanner of the SST 100. After a successful scan of an item at the scanner, the in-air haptic transducer 120 directs a customized pulse of air at the customer, which the customer can feel on his/her skin or clothing. The customized pulse of air may also generate direct in-air sound in a vicinity of the customer's ears. So, the customer feels a tactile in-air generated pulse of air after each successful scan and/or hears an in-air generated audio tone or message.

In an embodiment, the haptic controller 110 can cooperate with other audio and visual instructions occurring during the SS transaction with the customer to provide indications of what in-air tactile and/or in-audio communications the customer should be experiencing. This can assist in guiding the customer more efficiently through the SS transaction.

In an embodiment, the in-air generated communications (tactile and/or audible) can be always turned on for operation, turned on at the direction of the customer, turned on based on a customer profile, or turned on when factors determine the customer may experiencing problems during the transaction (slow customer responsiveness, activating a wrong sequence of input features, repeatedly activating an improper input feature, and the like). The customer may also be able to turn off the in-air generated communications, create a custom profile for the in-air generated communications, save the customer profile, and/or update an existing customer profile with modifications.

It is to be noted that the in-air haptic transducer 120 may or may not be enabled for in-air generated audio messages or tones, such that lower cost and easier deployment can be achieved based on the needs of the enterprise deploying the SST 100.

The SST 100 provides improved accessibility for handicapped customers but can also improve the experiences of customers that lack any discernible handicap. This improves the customer's experience during a SS transaction, increases customer operational efficiency, and improves SS transaction throughput.

These (above-discussed) embodiments for the haptic SST feedback and other embodiments are now discussed with reference to the FIGS. 2-4.

Figure 2:
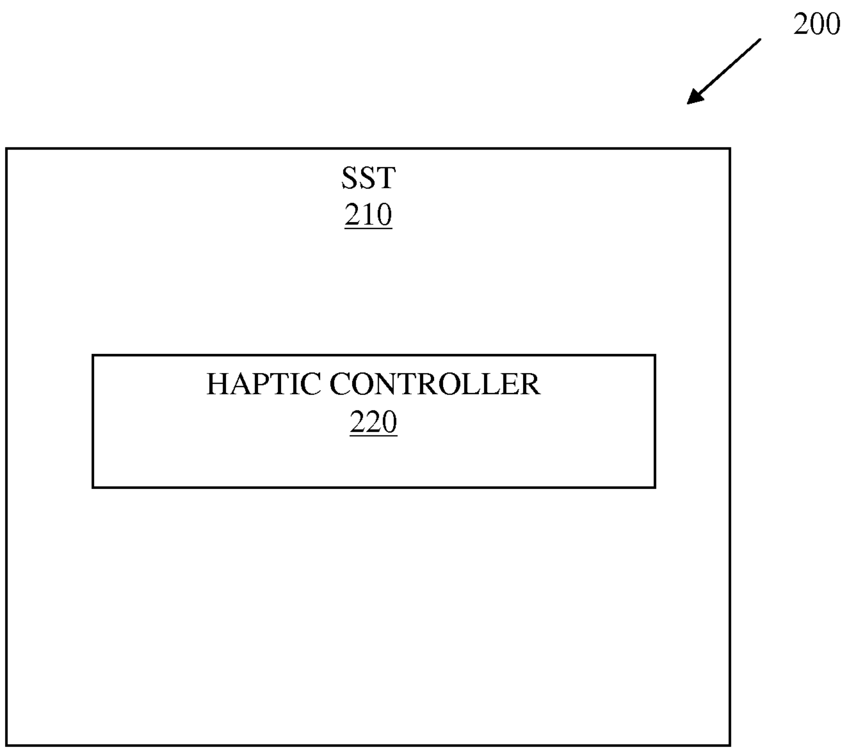
FIG. 2 is a diagram of a SST haptic feedback system, according to an example embodiment.

FIG. 2 is a diagram of a SST haptic feedback system 200, according to an example embodiment. SST haptic feedback system 200 includes physical and software resources. The software resources are programmed and reside within memory and/or non-transitory computer-readable storage media. The software resources execute on one or more processors of the SST haptic feedback system 200. The resources have access to one or more networks and the networks can be wired, wireless, or a combination of wired and wireless.

The SST haptic feedback system 200 includes a SST 210 and a haptic controller 220.

The SST 210 includes one or more processors, memory, peripheral devices, software applications, and network interfaces.

In an embodiment, the SST 210 is the SST 100 of the FIG. 1.

In an embodiment, the SST 210 is an ATM.

In an embodiment, the SST 210 is a grocery SS checkout station.

In an embodiment, the SST 210 is a kiosk.

The haptic controller 220 is implemented as one or more software modules that execute on processors of the SST 210.

In an embodiment, the haptic controller 220 is the haptic controller 110.

The haptic controller 220 is adapted and configured to: execute on the SST 210, receive an electronic message from a device of the SST 210, and communicate an in-air communication directed at a customer transacting at the SST for a SS transaction.

The electronic message is a communication that the device is providing to a customer as feedback during the SS transaction, such as an audio message, a visual message, and/or a print media outputted message. Such devices can include a variety of peripherals (monitors scanners, speakers, printers, etc.) associated with the SST 210.

According to an embodiment, the haptic controller 220 customizes the electronic message by interacting with a sensor or a camera (interfaced to the SST 210) to one or more of: detect a position of the customer at the SST 210, determine dimensions of the customer situated at the SST 210, and determine a location for body parts (feet, legs, arms, hands, eyes, face, ears, etc.) of the customer for which the in-air communication is to be directed by the haptic transducer.

In an embodiment, the haptic controller 220 customizes the electronic message by processing at least a portion of a profile for the customer to customize the message. For example, the profile may indicate an intensity level (force of air pulse/vibration or volume of air-generated audio) for the in-air audio communication, location to receive the in-air audio communication preferred by the customer, spoken language for any in-air generated audio message, preferred tone for any in-air audio generated message, points of a transaction where the in-air audio communication is desired to be provided to the customer, and the like.

In an embodiment, the haptic controller 220 customizes the electronic message as one or more of: an in-air tactile pulse/vibration and an in-air generated audio tone or message.

According to an embodiment, the haptic controller 220 customizes the message for an intensity level that the haptic transducer is to use for the in-air communication (this was discussed above).

Figure 3:
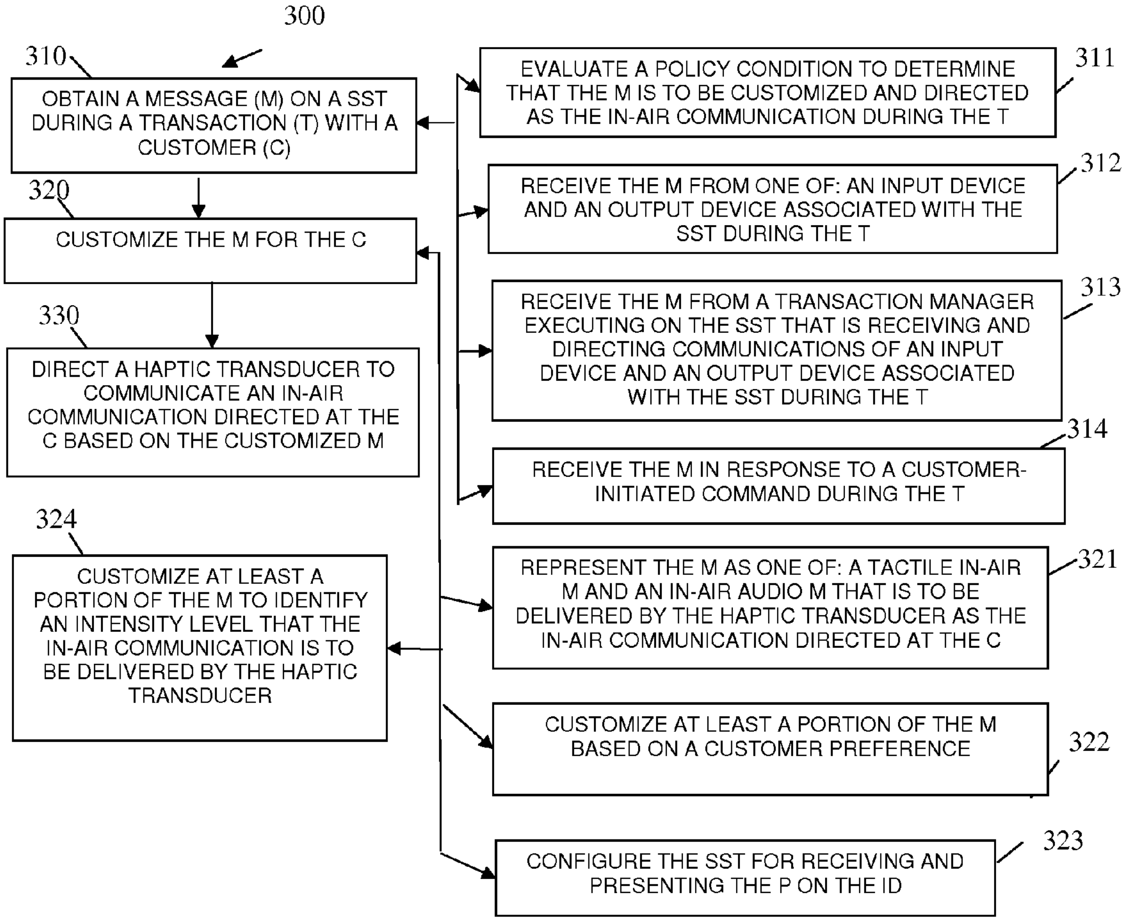
FIG. 3 is a diagram of a method for in-air haptic feedback SS transactions, according to an example embodiment.

FIG. 3 is a diagram of a method 300 for in-air haptic feedback SS transactions, according to an example embodiment. The software module(s) that implements the method 300 is referred to as a "SST in-air communication manager." The SST in-air communication manager is implemented as executable instructions programmed and residing within memory and/or a non-transitory computer-readable (processor-readable) storage medium and executed by one or more processors of a SST. The processor(s) of the SST that executes the SST in-air communication manager are specifically configured and programmed to process the SST in-air communication manager. The SST in-air communication manager has access to one or more networks during its processing. The networks can be wired, wireless, or a combination of wired and wireless.

In an embodiment, the SST in-air communication manager is the haptic controller 110 of the FIG. 1.

In an embodiment, the SST in-air communication manager is the haptic controller 210 of the FIG. 2.

In an embodiment, the SST in-air communication manager includes processing logic of the in-air haptic transducer 120 of the FIG. 1.

In an embodiment, the SST in-air communication manager is a combination of the haptic controller 110, the haptic controller 210, and processing logic of the in-air haptic transducer 120.

At 310, the SST in-air communication manager obtains an electronic message on the SST during a SS transaction with a customer. The electronic message is a feedback audio, print, and/or visual message being communicated by a device of the SST during the SST transaction with the customer. This electronic message is either directly sent to the SST in-air communication manager (such as through a transaction manager of the SST or from the devices) or intercepted and detected by the SST in-air communication manager (by monitoring devices and/or communication ports of the SST for communications).

In an embodiment, at 311, the SST in-air communication manager evaluates a policy condition to determine that the electronic message is to be customized and directed as an in-air communication during the SS transaction. For example, some electronic messages may be ignored based on a policy condition and will not generate any in-air communication.

According to an embodiment, at 312, the SST in-air communication manager receives the electronic message from one or: an input device (camera, microphone, scanner, keypad, etc.) and an output (monitor, speaker, printer, etc.) device associated with the SST during the SS transaction.

In an embodiment, at 313, the SST in-air communication manager receives the electronic message from a transaction manager executing on the SST. The transaction manager is receiving and directing communications of an input device and an output device associated with the SST during the SS transaction. So, the transaction manager may be a driver of the devices during the transaction and it provides the electronic message.

In an embodiment, at 314, the SST in-air communication manager receives the electronic message in response to a customer-initiated command during the SS transaction. Here, the customer may manually enable the feature to receive an in-air communication (feedback) during the SS transaction by using another input mechanism of the SST (keypad, touch screen, microphone coupled with voice recognition, etc.).

At 320, the SST in-air communication manager customizes the electronic message for the customer. The customization can include a variety of information that a haptic transducer processes to produce the in-air communication.

For example, at 321, the SST in-air communication manager can identify and represent the electronic message as a tactile in-air message (pulse/vibration) and/or an in-air audio generated message for processing by the haptic transducer and for delivering as the in-air communication directed at the customer during the SS transaction as a feedback mechanism during the transaction.

In another case, at 322, the SST in-air communication manager customizes at least a portion of the electronic message based on a customer preference (identified in a customer profile or supplied by the customer during the transaction as a preference via an input mechanism of the SST. The types of customer-provided preferences were identified above with the discussion of the customer profile in the FIGS. 1 and 2.

In an embodiment, at 323, the SST in-air communication manager customizes at least a portion of the electronic message to identify an intensity level that the in-air communication is to be delivered by the haptic transducer. This was discussed above with reference to the FIGS. 1 and 2.

Figure 4:
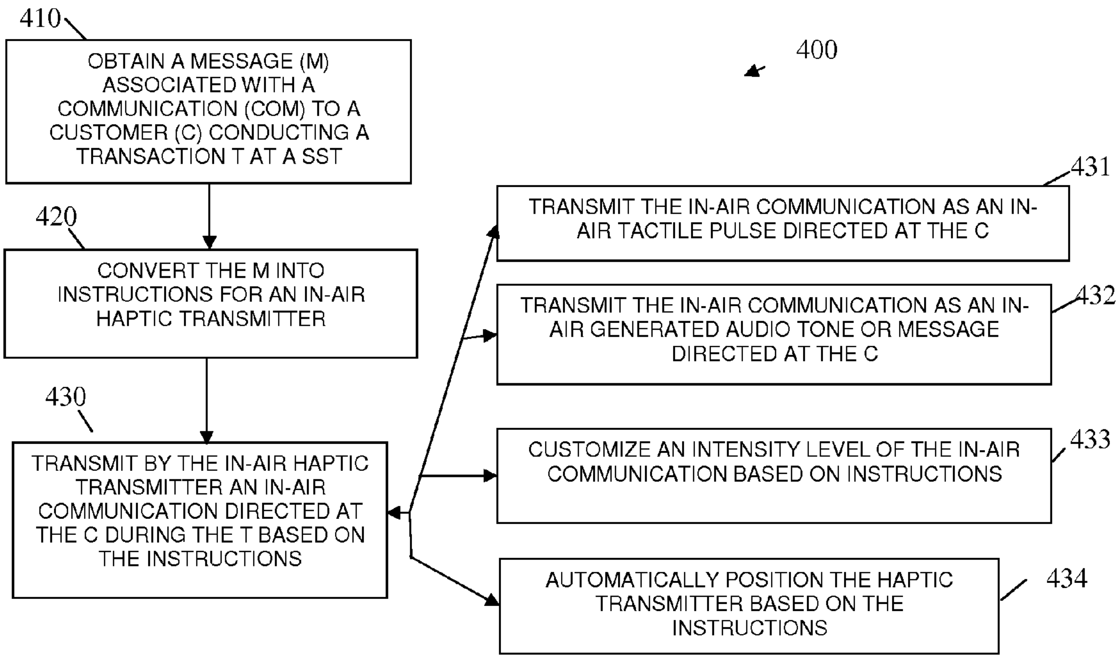
FIG. 4 is a diagram of another method for in-air haptic feedback SS transactions, according to an example embodiment.

FIG. 4 is a diagram of another method for in-air haptic feedback SS transactions, according to an example embodiment. The software module(s) that implement the method 300 is referred to herein as a haptic air communication generator. The haptic air communication generator is implemented as executable instructions and programmed within memory and/or a non-transitory computer-readable (processor-readable) storage medium that executes on one or more processors of a haptic transducer. The processors of the haptic transducer are specifically configured to execute the haptic air communication generator. The haptic air communication generator can access one or more networks; the networks can be wired, wireless, or a combination of wired and wireless.

In an embodiment, the haptic transducer that processes the haptic air communication generator is the in-air haptic transducer 120 of the FIG. 1.

In an embodiment, the haptic air communication generator implements portions of the SST in-air communication manager of the FIG. 3.

At 410, the haptic air communication generator obtains an electronic message associated with an electronic feedback communication directed to a customer during a SS transaction at an SST.

At 420, the haptic air communication generator converts the electronic message into instructions for an in-air haptic transmitter.

At 430, the in-air haptic transmitter transmits an in-air communication directed at the customer during the SS transaction based on the instructions.

According to an embodiment, at 431, the in-air haptic transmitter transmits the in-air communication as an in-air tactile pulse/vibration directed at the customer or in the vicinity of the customer.

In an embodiment, at 432, the in-air haptic transmitter transmits the in-air communication as an in-air generated audio tone or message directed at the customer.

In an embodiment, at 433, the in-air haptic transmitter customizes an intensity level (force or pulse or volume of audio) of the in-air communication based on the instructions.

In an embodiment, at 434, the in-air haptic transmitter automatically positions itself based on the instructions so as to more accurately direct the in-air communication at or in the vicinity of the customer or body parts of the customer.

One now appreciates how communications before, during, and/or after a SS transaction occurring at an SST can be improved through tactile and/or audio communications directed to customers of the SST.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:

a Self-Service Terminal (SST); and a haptic controller adapted and configured to: i) execute on the SST, ii) receive a message from a device of the SST, and iii) customize the message for a haptic transducer to communicate an in-air communication directed at a customer transacting at the SST, wherein the message is customized based on a customer created and saved profile for transactions that the customer performs at the SST.

2. The system of claim 1, wherein the haptic controller in ii) obtains the message from that device that is one of: a scanner, a monitor, a printer, a weighing device, a sensor, a camera, and keyboard.

3. The system of claim 1, wherein the haptic controller in iii) interacts with a sensor or a camera to one or more of: detect a position of the customer at the SST, determine dimensions of the customer, and determine a location for body parts of the customer for which the in-air communication is to-be directed by the haptic transducer.

4. The system of claim 1, wherein the haptic controller in iii) customizes the message as one or more of: an in-air tactile air pulse and an in-air generated audio tone or message.

5. The system of claim 1, wherein the haptic controller in iii) customizes the message for an intensity level that the haptic transducer is to use for the in-air communication.

6. The system of claim 1, wherein the SST is one of: an Automated Teller Machine (ATM), a grocery checkout station, and a kiosk.

7. A method, comprising:

obtaining, by a haptic controller executing on a Self-Service Terminal (SST), an electronic message on the SST during a Self-Service (SS) transaction with a customer;

customizing, by the haptic controller, the electronic message for the customer based on a customer created and saved profile for the SS transaction; and directing, by the haptic controller, a haptic transducer to communicate an in-air communication directed at the customer based on the customized electronic message.

8. The method of claim 7, wherein obtaining further includes evaluating a policy condition to determine that the electronic message is to-be customized and directed as the in-air communication during the SS transaction.

9. The method of claim 7, wherein obtaining further includes receiving the electronic message from one of: an input device and an output device associated with the SST during the SS transaction.

10. The method of claim 7, wherein obtaining further includes receiving the electronic message from a transaction manager executing on the SST that is receiving and directing communications of an input device and output device associated with the SST during the SS transaction.

11. The method of claim 7, wherein obtaining further includes receiving the electronic message in response to a customer-initiated command during the SS transaction.

12. The method of claim 7, wherein customizing further includes representing the electronic message as one of: a tactile in-air message and an in-air audio message that is to be delivered by the haptic transducer as the in-air communication directed at the customer.

13. The method of claim 7, wherein customizing further includes customizing at least a portion of the electronic message based on a customer preference.

14. The method of claim 7, wherein customizing further includes customizing at least a portion of the electronic message to identify an intensity level that the in-air communication is to be delivered by the haptic transducer.

15. A method, comprising:

obtaining, by a haptic transducer, an electronic message associated with an electronic communication to a customer conducting a Self-Service (SS) transaction at a Self-Service Terminal (SST), wherein the electronic message is customized based on a customer created and saved profile for the SST transaction;

converting, by the haptic transducer, the electronic message into instructions for an in-air haptic transmitter; and transmitting, by the in-air haptic transmitter, an in-air communication directed at the customer during the SS transaction based on the instructions.

16. The method of claim 15, wherein transmitting further includes transmitting the in-air communication as an in-air tactile pulse directed at the customer.

17. The method of claim 15, wherein transmitting further includes transmitting the in-air communication as an in-air generated audio tone or message directed at the customer.

18. The method of claim 15, wherein transmitting further includes customizing an intensity level of the in-air communication based on the instructions.

19. The method of claim 15, wherein transmitting further includes automatically positioning the haptic transmitter based on the instructions.

* * * * *